L. BURGESS.
PROCESS FOR TREATING RESIDUES RESULTING FROM THE TREATMENT OF HYDROCARBON WITH ALUMINUM CHLORID.
APPLICATION FILED JAN. 15, 1918.
1,401,113.
Patented Dec. 20, 1921.
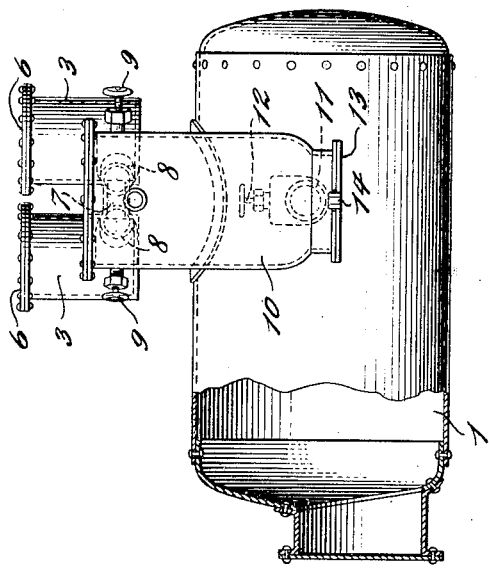
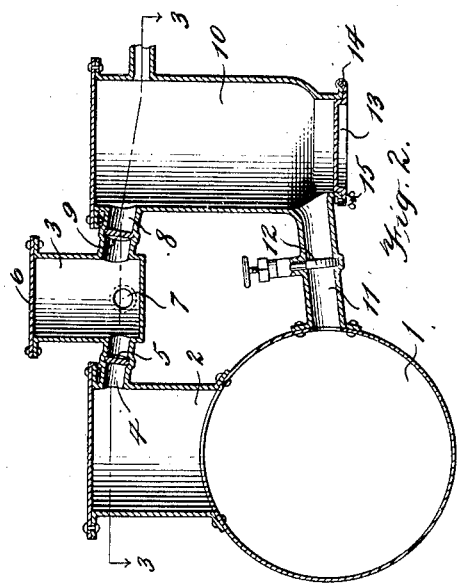
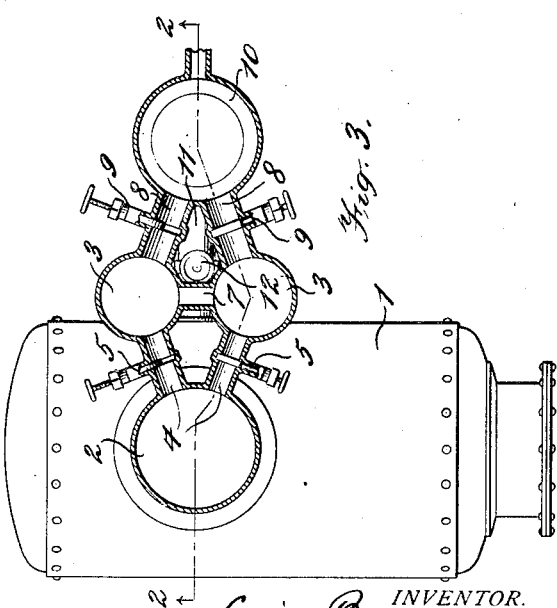

UNITED STATES PATENT OFFICE.

LOUIS BURGESS, OF NEW YORK, N. Y., ASSIGNOR TO STANDARD OIL COMPANY, A CORPORATION OF NEW JERSEY.

PROCESS FOR TREATING RESIDUES RESULTING FROM THE TREATMENT OF HYDROCARBON WITH ALUMINUM CHLORID.

1,401,113.     Specification of Letters Patent.     Patented Dec. 20, 1921.

Application filed January 15, 1918. Serial No. 211,912.

*To all whom it may concern:*

Be it known that I, LOUIS BURGESS, a citizen of the United States, residing at New York city, in the county of New York and State of New York, have invented a certain new and useful Process for Treating Residues Resulting from the Treatment of Hydrocarbons with Aluminum Chlorid, of which the following is a specification.

My invention is a new and useful process for treating residues (resulting from the treatment of hydrocarbons with aluminum chlorid and heat), in order to obtain and recover valuable substances remaining in said residues, and will be found particularly applicable to the recovery or regeneration of the aluminum chlorid which has been employed in the distillation of petroleum oils for the production of lower-boiling point hydrocarbons, for example, such as gasolene and naphtha. In the treatment of hydrocarbons, such as petroleum oils, with aluminum chlorid and heat for the production of lower-boiling point products, a residue is formed in the treating vessel or still in the form of a coky or tarry mass containing a large percentage of the constituents of the aluminum chlorid with which the oil has been treated. The exact composition of the residue is variable, depending on the conditions under which the treatment or distillation was carried out and the character of the oil treated. A part of the aluminum chlorid undoubtedly exists as such, but in combination with heavy hydrocarbons with a link between the aluminum chlorid and hydrocarbon molecules, while a further portion of the aluminum chlorid has undergone a more fundamental change.

Previous processes have been suggested in order to recover the aluminum chlorid from said residues, for example, the heating of a hydrated chlorid extracted from the residues with water, resulting in the production of a moist hydrochloric acid gas and a residue of alumina, or in moistening the residues with water to form a hydrated chlorid, without extracting same and then applying heat, which breaks up the hydrated chlorid producing gaseous hydrochloric acid and leaving a residue of carbon, heavy hydrocarbons and alumina. These processes are objectionable because the moist hydrochloric acid is corrosive and the residues are difficult to handle; also the hydrochloric acid must be dried before it can be used in any process in which a dry gaseous hydrochloric acid is required. The carbonaceous residue disintegrates under the treatment and is in a finely divided condition, and inasmuch as it contains a large percentage of water it is difficult to burn as fuel. Another process has been suggested consisting in extracting the chlorid by the use of alcohol, carbon tetrachlorid and other solvents, which are relatively expensive. A third process consists in heating the residues and contacting them with chlorin, which is both expensive and difficult to handle, and which in the presence of hydrocarbons, such as exist in the residues, is almost immediately degraded into hydrochloric acid which does not appear to have any effect on the residues.

I have discovered that the residues may be decomposed by the simple application of heat at a proper temperature without the use or application of material to cause chemical reaction in the residue, with the result that a simple and effective process capable of commercial application is made available and a high percentage of recovery of the aluminum chlorid as well as the obtaining of other products, (for example, dry hydrochloric acid gas), of useful application in the arts is accomplished.

My process is not only inexpensive to carry out, but has the advantage that no chemicals need be added; the hydrochloric acid gas produced is dry and may be immediately used in any process in which dry gaseous hydrochloric acid is required, and the carbonaceous material remaining in the still or other vessel after the treatment, together with the alumina produced, are in a dry, coherent condition. They do not fume and have practically no odor, and may be used as a fuel without annoyance or danger to workmen, nor does the burning thereof result in atmospheric pollution. The ash or residue left after such combustion consists essentially of alumina and may be used for any purpose for which that material is ordinarily used.

In the production of low-boiling point hydrocarbons such as gasolene or naphtha by the treatment of petroleum oils with aluminum chlorid accompanied by heat, or for other purposes, the oil with the aluminum chlorid mixed therewith is usually heated in a still or other vessel. In the case of a distillation process for the recovery of low-boiling products, such as gasolene or naphtha, the petroleum oil and aluminum chlorid in contact therewith are heated in a still. I will describe the preferred embodiment of my invention as applied to the residues resulting from such a process.

Briefly stated the new process consists in decomposing the residues by the simple application of heat of such a degree as to result in the chemical decomposition of the residues. I have discovered that if the residues are subjected to a red or yellow heat the best results are obtained, although the reaction commences at about 400° C., and if this heating is prolonged said temperature will be sufficient to produce the reaction. If a dull red heat is used a few hours' heating (for example four hours) may be required to effect the desired decomposition, and if a bright red heat (about 700° C.) is used the decomposition may be completed in from one to two hours. Higher temperatures than 700° C. may be employed, for example, a white heat, which will be sufficient to produce the reaction in a few minutes. It will be understood that the temperatures may be varied within the approximate limits stated according to the nature of the apparatus employed and its capacity to withstand high temperatures, and the time within which it is desired to complete the reaction.

Under the influence of heat at the temperatures mentioned the carbonaceous residues are decomposed, resulting in the production of anhydrous aluminum chlorid, compounds of aluminum chlorid with hydrocarbon oils, dry hydrochloric acid gas, and a rich illuminating gas. The hydrochloric acid gas and the illuminating gas are permanent gases and the other products mentioned are volatile at the temperatures employed. The residue remaining from the operation by which the products mentioned have been removed is involatile and consists largely, if not entirely, of carbon and alumina (aluminum oxid).

The volatilized products, i. e., anhydrous aluminum chlorid and the aluminum chlorid hydrocarbon compounds may be separated from the hydrochloric acid gas and the illuminating gas, for example by means of condensation, while the hydrochloric acid gas (admixed with the illuminating gas) may be employed, if desired, in the production of aluminum chlorid from aluminum carbid, as is described in the United States patent to Barnett & Burgess No. 1,218,588, dated March 6, 1917. Or, if desired, the hydrochloric acid gas may be passed through tourelles, or through a scrubbing tower, and the hydrochloric acid gas taken up in the water to form muriatic acid, the purified illuminating gas being passed to a gas holder or collected in any suitable manner for use in the ordinary way.

Another method is to pass the mixed gases containing the volatilized aluminum chlorid, the volatilized aluminum chlorid hydrocarbon compounds, the gaseous hydrochloric acid, and the illuminating or hydrocarbon gas through a body of aluminum carbid, whereupon the hot hydrochloric acid will act upon the carbid to form aluminum chlorid, by an exothermic reaction, the aluminum chlorid so formed being suitably condensed, and the illuminating gas being separated therefrom for any use to which it is suited.

The preferred manner of performing the method is to heat the residues in accordance with my process in the same still or vessel in which the distillation or treatment of the hydrocarbon oil in the presence of aluminum chlorid has been carried on. The volatilized and gaseous products of the thermal decomposition of the residues while still hot are passed through a chamber connected by a passage to the still body and charged with aluminum carbid. In passing through this chamber, the hydrocarbon gas, the volatile aluminum chlorid hydrocarbon compounds, and the gaseous aluminum chlorid are unaffected or unchanged, but the hydrochloric acid and the aluminum carbid react exothermically to produce anhydrous aluminum chlorid. The gases from this retort or chamber wherein the aluminum carbid is subjected to hydrochloric acid gas may be passed through a suitable trap or condenser maintained at a temperature below the volatilizing temperature of aluminum chlorid wherein the anhydrous aluminum chlorid and the aluminum chlorid compounds condense and are separated from the hydrocarbon gas, which may then be passed on to any suitable collector or point of use.

The practice of the process constituting my invention as above outlined is not limited to the use of an apparatus of any particular construction, but in the accompanying drawings I have shown one form of apparatus which may be efficiently employed for properly carrying out the process. In these drawings—

Figure 1 is a side elevation partly in section of a still body of ordinary construction, and certain parts applied thereto for carrying out my invention, where the heating step is to be performed in the still in which the treatment of the hydrocarbon has been performed.

Fig. 2 is a section view on the line 2—2 of Fig. 3.

Fig. 3 is a top section view on the line 3—3 of Fig. 2.

I will now describe in detail one method of practising the process constituting my invention employing the apparatus shown in the above drawings.

1 designates the shell of an ordinary still or vessel which may be of any suitable construction capable of withstanding the temperatures employed in and the chemical action of the materials employed and produced in the process. This shell, after treatment of hydrocarbon therein with aluminum chlorid and heat, contains a residue, which as above stated consists of a coky or tarry mass which may contain aluminum chlorid as such in combination with heavy hydrocarbons, and also further portions of the aluminum chlorid which may have undergone a more fundamental change. It will be understood that the still is provided with any suitable means, not shown, for heating the same so that the contents thereof will be subjected to temperatures coming within the scope of my present invention, but I have not shown such heating means, as these may be supplied readily by those skilled in the art.

The primary purpose of my invention is to recover the aluminum chlorid as such, or in combination with other substances, in such condition that it may be again employed in the treatment of hydrocarbons, and also to recover other valuable constituents from the residue, for example, hydrochloric acid and substances which may be employed as fuel. I accomplish this purpose by a simple application of heat to the residue mass within the still, employing, if desired, ordinary still heating means for this purpose, or by the use of any heating means necessary to create the necessary temperature. In order to do this, the still is heated until the residue mass reaches a temperature which will result in chemical decomposition of the residue, producing volatilized aluminum chlorid, and aluminum chlorid hydrocarbon compounds, and incidentally hydrochloric acid gas, and a combustible gas. I have found by actual work and experience, that the desired reaction producing such chemical decomposition becomes effective at a temperature at or about 400° C. and increases in energy as the temperature is raised above this point. The time or speed of carrying out the process is largely dependent upon the temperature employed to produce decomposition. For example, I have found that the desired decomposition will be initiated as stated at about 400° C., which will efficiently secure the desired result if maintained long enough, but from a commercial standpoint might be objectionable, due to the length of time required to decompose a given body of residue. I have found by actual tests, that the process is efficiently carried out if the temperature is raised to a bright red heat, about 700° C. which will be found sufficient to complete the chemical decomposition of the residue in from one to two hours. I, however, do not limit myself to the minimum or maximum temperatures mentioned, as higher temperatures may be used in apparatus constructed to withstand said higher temperatures.

The result of the heating at the temperatures mentioned is to chemically decompose the residue thereby producing volatilized aluminum chlorid, volatilized aluminum chlorid hydrocarbon compounds, dry hydrochloric acid gas and illuminating gas. One method of recovering and utilizing the products named of this decomposition is to start at the close of the oil treatment when the still is at a temperature of approximately 400° C., and contains the tarry or coky residues from the distillation of oil with aluminum chlorid, and to permit or cause the gases and volatilized products to pass into a dome 2 connecting with the still or other receptacle in which the residue is heated, and to conduct these substances through a chamber or chambers 3 connected to said dome by a duct or ducts 4, said ducts being controlled, if desired, by valves 5, and which chambers 3, may contain aluminum carbid crushed to about 4 mesh, and arranged in the path of the volatile substances, so as to be subjected to contact therewith. Said chambers are connected by a cross duct 7 for a purpose to be presently described. The chambers 3 may have removable bolted heads or covers 6 which can be removed to permit charging of the chambers. In the chambers 3 the hot volatile hydrochloric acid gas will react with the aluminum carbid by an exothermic reaction to produce a volatile aluminum chlorid. The aluminum chlorid hydrocarbon compounds and the combustible gas do not react upon the aluminum carbid, and they, with the additional volatilized aluminum chlorid formed by the reaction of the hydrochloric acid with the carbid may be conducted from the chambers 3 through pipes 8 controlled by valves 9 to a condenser 10 of any suitable construction maintained at a temperature below the volatilizing temperature of aluminum chlorid in which the volatile aluminum chlorid resulting directly from the decomposition, and also from the reaction of the hydrochloric acid gas and the carbid will be condensed and collected. From this condenser 10, the condensed anhydrous aluminum chlorid may be removed in any suitable manner. In passing the volatile products through the carbid chambers 3 it is preferred to close one of the valves 5 leading into one carbid container, and the valve 9 leading from the other carbid chamber to the condenser 10. The volatile products then pass into one of the chambers 3 then through the duct 7 to the other chamber and from the said other chamber to the condenser 10 through the duct 8, such products circulating through both chambers, thereby converting the hydrochloric gases into aluminum chlorid. When the desired heat has been maintained until the production of gas has stopped, the operation is complete and is discontinued. The residue in the still will be found to be substantially free from chlorin, or any compound containing chlorin. It consists essentially of carbons and alumina and contains ordinarily less than 1% of the chlorin content of the aluminum chlorid with which the still was charged. The condenser 10 may be connected by a return duct 11 to the interior of the vessel 1, in order that the condensed aluminum chlorid may be returned to said vessel for use in treatment of subsequent bodies of oil. The return of the aluminum chlorid is accomplished by recharging the vessel 1 with oil and with an amount of aluminum chlorid if desired (after first removing the residue remaining after the practice of my process) and heating the same to cause oil vapors to pass over to and be condensed in the condenser 10, and to flow back to the still body through the duct 11, the hydrocarbon fluid forming compounds with the aluminum chlorid which together with the compounds condensed in the condenser flow back to the vessel 1. The duct 11 is preferably provided with a suitable valve 12, which is opened to permit flow, and is closed to cut off the flow from the condenser. When the flow has proceeded long enough, the valve 12 may be closed, and the treatment of the oil may be proceeded with. The products may be removed from the receptacle by opening a door or trap 13 hinged at 14 to the receptacle and releasably held closed by a bolt 15 or other fastening means.

In performing the step just described of returning the aluminum chlorid to the vessel 1, it is preferred to replenish the first carbid chamber 3 with fresh carbid and to adjust the valves 5 and 9 so that the gases issuing from the vessel 1, pass first through the partially exhausted carbid in the second chamber 3, and then through the first chamber containing the fresh carbid. It will ordinarily require about four hours to cause the aluminum chlorid and chlorid compounds to be completely returned to the still. In the condenser the only products eliminated are the aluminum chlorid, and the aluminum chlorid hydrocarbon compounds; the combustible gas may be conducted off through a duct 16 leading to any point for use, recovery or storage. As just described, the process involves the production of additional quantities of aluminum chlorid, but if desired, the chambers 3 may be entirely omitted and the products of the decomposition carried directly to a condenser such as 10 without intermediate chemical action, or if desired, the chambers 3 need not be charged with aluminum carbid, and, therefore, the same result be obtained as though said chambers were omitted from the construction. If the chambers 3 are omitted or not charged with aluminum carbid, the mixture of gaseous matter will pass into the condenser 10 and the aluminum chlorid compounds be condensed out, and the hydrochloric acid and remaining gaseous matter will pass over through the outlet 16.

What I claim and desire to secure by Letters Patent of the United States is—

1. The process of treating residue resulting from heat treatment of hyrocarbon oil in the presence of anhydrous aluninum chlorid, which consists in heating said residue to a temperature sufficiently high to produce gaseous matter comprising gaseous hydrochloric acid, and passing said gaseous matter in contact with material reacting with the hydrochloric acid to thereby produce anhydrous aluminum chlorid.

2. The process of treating residue resulting from heat treatment of hydrocarbon oil in the presence of anhydrous aluminum chlorid, which consists in heating said residue to a temperature sufficiently high to produce gaseous matter comprising gaseous hydrochloric acid, and passing said gaseous matter in contact with aluminum carbid, whereby the hydrochloric acid reacts with the said carbid to produce anhydrous aluminum chlorid.

3. The process of treating residue resulting from heat treatment of hydrocarbon oil in the presence of anhydrous aluminum chlorid, which consists in heating said residue to a temperature sufficient to decompose the same into a gaseous mixture of hydrochloric acid, volatilized aluminum chlorid, volatilized aluminum chlorid-hydrocarbon compounds, and hydrocarbon gas, and condensing the anhydrous aluminum chlorid to separate it from said mixture.

4. The process of treating residue resulting from heat treatment of hydrocarbon oil in the presence of anhydrous aluminum chlorid, which consists in heating said residue to a temperature sufficient to decompose the same into a gaseous mixture comprising hydrochloric acid, volatilized aluminum chlorid, volatilized aluminum chlorid-hydrocarbon compounds, and hydrocarbon gas, and passing the hydrochloric acid and said volatilized products in contact with aluminum carbid.

5. The process of treating residue resulting from heat treatment of hydrocarbon oil in the presence of anhydrous aluminum chlorid, which consists in heating said residue to a temperature sufficient to decompose the same into a gaseous mixture comprising hydrochloric acid, volatilized aluminum chlorid, volatilized aluminum chlorid-hydrocarbon compounds, and hydrocarbon gas, passing the hydrochloric acid gas and said volatilized products in contact with aluminum carbid, and recovering the anhydrous aluminum chlorid so formed and the said volatilized anhydrous aluminum chlorid together.

6. The process of treating residue resulting from heat treatment of hydrocarbon oil in the presence of anhydrous aluminum chlorid, which consists in heating said residue to a temperature sufficient to decompose the same into a gaseous mixture comprising hydrochloric acid, volatilized anhydrous aluminum chlorid, volatilized aluminum chlorid-hydrocarbon compounds, and hydrocarbon gas, passing the hydrochloric acid and said volatilized products in contact with aluminum carbid, recovering the aluminum chlorid so formed and the said volatilized anhydrous aluminum chlorid by treatment involving separation from the hydrocarbon gas and conducting away the hydrocarbon gas.

7. The process of treating residue resulting from the heat treatment of hydrocarbon oil with anhydrous aluminum chlorid, which consists in heating said residues to a temperature sufficiently in excess of 400° C., to produce volatilized aluminum chlorid, aluminum chlorid-hydrocarbon compounds, hydrochloric acid gas, and hydrocarbon gas, passing the said products in a heated condition in contact with aluminum carbid, thereby producing aluminum chlorid, then subjecting the product to condensation conditions to thereby condense the anhydrous aluminum chlorid and aluminum chlorid hydrocarbon compounds, and conducting off the remaining gas.

8. The process of treating residue resulting from the heat treatment of hydrocarbon oil, with anhydrous aluminum chlorid, which consists in heating said residue to a temperature sufficiently in excess of 400° C.; to produce volatilized aluminum chlorid, aluminum chlorid-hydrocarbon compounds, hydrochloric acid gas, and hydrocarbon gas, passing the said products in a heated condition in contact with aluminum carbid, thereby producing aluminum chlorid, then passing the product through a suitable condenser, thereby condensing the aluminum chlorid and aluminum chlorid hydrocarbon compounds and conducting off the remaining gas, operating said condenser as a reflux condenser on the succeeding heat treatment of oil with anhydrous aluminum chlorid for the purpose of converting the anhydrous aluminum chlorid into aluminum chlorid hydrocarbon compounds and for the purpose of carrying the same into the still body.

9. The process of treating residue resulting from heat treatment of hydrocarbon oil in the presence of anhydrous aluminum chlorid, which consists in heating said residue to a temperature sufficient to cause decomposition of the residue into volatilized products, including gaseous hydrochloric acid, at a temperature sufficient to initiate exothermic reaction when contacted with aluminum carbid, and passing said volatilized products while at such temperature in contact with aluminum carbid.

In testimony whereof I have hereunto signed my name in the presence of two subscribing witnesses.

LOUIS BURGESS.

Witnesses:
U. AGGAR,
E. M. LOCKWOOD.